United States Patent Office 3,479,319
Patented Nov. 18, 1969

3,479,319
POLYETHYLENE TEREPHTHALATE STABILIZED WITH SODIUM PYROPHOSPHATE
William L. Hergenrother, Akron, Ohio, assignor to The Firestone Tire & Rubber Company, Akron, Ohio, a corporation of Ohio
No Drawing. Filed Sept. 19, 1967, Ser. No. 668,945
Int. Cl. C08g 51/56
U.S. Cl. 260—45.7                   8 Claims

ABSTRACT OF THE DISCLOSURE

This invention comprises a process for stabilizing polyethylene terephthalate against thermal decomposition, and the thermally stabilized composition produced thereby. This stabilization is effected by dispersing sodium pyrophosphate in the polyethylene terephthalate in an amount of 0.05–1% by weight, preferably about 0.3% by weight. This invention is particularly useful with polyethylene terephthalate having a molecular weight of at least 10,000. This dispersion can be effected by any appropriate means but is advantageously effected by applying a suspension of sodium pyrophosphate dispersed in a liquid medium to particles of polyethylene terephthalate and thereafter evaporating the liquid suspension medium therefrom. Preferred liquid suspension media are water, mineral oil, etc., and the vaporization is preferably effected under vacuum.

BACKGROUND OF THE INVENTION

Field of the invention

The present invention relates to the stabilization of polyethylene terephthalate against thermal decomposition.

Description of the related prior art

Polyethylene terephthalate is used commercially for the production of fibers useful in textiles, tire cord, etc., as well as for the production of film and other shaped articles. For the production of fibers, melt spinning processes are generally used. These require that the polyethylene terephthalate be melted and maintained in a molten condition for substantial periods prior to and during the spinning operation. In the course of maintaining the polymer in a molten condition, a substantial amount of thermal degradation occurs. This results in a lowering of the molecular weight and the production of undesirable byproducts which detract from the polymer properties. Consequently the starting material must have a higher weight than eventually desired and other precautions must be taken to offset or counteract the effects of the thermal degradation.

Since the molten polyethylene terephthalate is maintained for the spinning operation at a temperature of about 275–285° C. it is necessary to take special precautions to retard thermal decomposition. It is particularly important that there be no moisture present, since this increases the tendency for degradation. Moreover metal residues left from the polymerization catalysts generally used also promote degradation of the polymer at high temperatures.

Very often, the polyethylene terephthalate is used directly after preparation, and since the preparation involves maintaining a reduced pressure of approximately 0.1 mm. Hg on the molten polymer for the purpose of removing final traces of water and glycol, it is desirable to perform the spinning operation as soon after preparation as possible so that the period of exposure to high temperatures is reduced to a minimum. For example, if the polymer is cooled after preparation and then reheated after a storage peroid, there is a period in the early stages of the cooling period and in the final stages of the preheating or melting operation when the polymer is exposed to relatively high temperatures.

It has been found that if the moisture is not substantially completely removed, or if moisture is absorbed during the storage period, or if the period at relatively high temperatures is prolonged, there is considerable degradation or decrease in the molecular weight of the polymer. In fact it has been found that in order to reduce the decomposition rate, it is most desirable to dry the polymer before exposure to high temperatures.

In addition to the decomposition effected by the presence of moisture in the polymer, certain metal residues from the polymerization catalysts used in the preparation also promote degradation in the polymer. Metal residues such as Mg, Zn, Ca, Pb, Sb, etc. promote degradation of the polyethylene terephthalate.

SUMMARY OF THE INVENTION

In accordance with the present invention, it has been found that the thermal degradation or decomposition of polyethylene terephthalate as described above is effectively retarded or inhibited by the addition of sodium pyrophosphate. The sodium pyrophosphate is added in finely divided form, either dry or as a solution or a suspension in a liquid which can be eventually removed by vaporization. If the sodium pyrophosphate is being added to molten polyethylene terephthalate at the end of the preparation thereof, it can be advantageously added in dry, finely divided form, preferably moisture-free and under a vacuum or a blanket of inert gas.

If the polymer is to be cooled and stored, the sodium pyrophosphate is advantageously added any time prior to the preheating for spinning purposes. Advantageously the sodium pyrophosphate is added at the end of the preparation period, regardless of whether it is to be spun immediately or is to be cooled, stored and then reheated.

If the sodium pyrophosphate is added in the form of a solution or liquid suspension, the liquid medium is advantageously immediately removed by vaporization under the temperature and reduced pressure conditions described herein. This results in a suspension of the sodium pyrophosphate in the molten polymer and in the solid polymer once the polyester is cooled below the solidification temperature. If the polymer is solidified and then converted to particle form, the polymer particles can be coated by treatment with a solution or suspension of the sodium pyrophosphate in a liquid medium, and the liquid medium immediately removed by appropriate temperature and reduced pressure so as to leave finely divided particles of sodium pyrophosphate dispersed on the surfaces of the polyethylene terephthalate.

Any appropriate solvent or suspension medium can be used in preparation of the sodium pyrophosphate dispersion, provided the suspension medium is one which does not react with either the sodium pyrophosphate or the polyethylene terephthalate and can also be easily removed therefrom. Preferred suspension media are water, mineral oil, etc.

Any grade of sodium pyrophosphate can be used provided it does not contain impurities which have a deleterious effect on the polymer.

The sodium pyrophosphate is added in an amount advantageously in the range of 0.05 to 1 percent by weight based on the combined weight of polymer and stabilizer. A proportion of approximately 0.3% by weight has been found to be particularly advantageous.

The invention has been found to be patricularly appropriate for polyethylene terephthalate having a molecular weight of at least 10,000. The higher the molecular weight being used or desired, the more important it is to have a stabilizer present to avoid degradation. For more commercial spinning operations, it is desirable to have a molecular weight of at least 20,000–25,000.

In determining thermal degradation tendencies, a sample of polymer is dried well by heating overnight at 110° C. in a vacuum or reduced pressure of 0.1 mm. or less. The resultant dried polymer is then loaded under nitrogen to the chamber of a Mullowney Viscometer maintained at 300° C. and having a die opening 0.043″ in diameter and 0.848″ in length. A ball is placed on top of the polymer, and the chamber is sealed under nitrogen. By absorbing heat from the chamber, the polymer begins to melt within 15 minutes, following which the chamber is pressurized with lamp grade nitrogen (free from oxygen and water) to a pressure of 500 p.s.i. and the molten polymer is extruded from the chamber through the die. The length or weight extruded in a period of 15 minutes is measured and the flow rate determined thereby. The pressure is then released and the extrusion procedure repeated at 15 minute intervals. The logarithm of the flow rate is plotted vs. time of exposure of the polyethylene terephthalate polymer to a temperature of 300° C. The plot is a straight line whose slope represents the decomposition rate.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

To a 200 ml. round bottom flask equipped with a stirrer, nitrogen inlet tube and vacuum takeoff is added 80 gm. of polyethylene terephthalate particles. This polymer has a 300° C. decomposition rate of 1.12 per hour and an intrinsic viscosity of 0.93. To this is added 0.24 gm. of sodium pyrophosphate as a 5% aqueous solution. The water is removed by heating the mixture under a blanket of nitrogen at 200° C., leaving a fine dust of sodium pyrophosphate coating the polymer particles. The polyester is then melted at 275° C. and the pressure is gradually reduced. The reaction is continued for 3 hours at 275–285° C. under a pressure of 0.04–0.10 mm. of mercury. Upon cooling, a white polymer with finely dispersed particles of sodium pyrophosphate therein is obtained having an intrinsic viscosity of 1.23 and a 300° C. decomposition rate of 0.88 per hour.

EXAMPLE II

The procedure of Example I is repeated with similar results using, in place of the aqueous solution, a suspension of finely divided sodium pyrophosphate in mineral oil and the mineral oil is removed at a temperature of 275–285° C. and approximately 0.10 mm. of mercury.

Other means of giving a fine dispersion of the sodium pyrophosphate in the polyester may be used with equal success.

Similar improvements are noted when the above procedures are repeated using polyethylene terephthalate of different molecular weights and varying amounts of sodium pyrophosphate.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A molten polyethylene terephthalate containing 0.05–1 percent by weight of finely divided sodium pyrophosphate dispersed therein.

2. A molten polyethylene terephthalate of claim 1 having approximately 0.3 percent by weight of sodium pyrophosphate.

3. A molten polyethylene terephthalate of claim 1 in which said polyethylene terephthalate has a molecular weight of at least 10,000.

4. A process for stabilizing polyethylene terephthalate against thermal decomposition during the melting thereof comprising the step of applying finely divided particles of sodium pyrophosphate onto the surface of polyethylene terephthalate particles, and thereafter melting said polyethylene terephthalate, thereby producing a dispersion of finely divided sodium pyrophosphate in molted polyethylene terephthalate.

5. The process of claim 4 in which said sodium pyrophosphate is applied in a proportion of 0.05–1 percent based on the combined weight of polyethylene terephthalate and sodium pyrophosphate.

6. The process of claim 4 in which said sodium pyrophosphate is applied as a dispersion in a liquid medium, and the liquid medium is subsequently vaporized, thereby depositing the said sodium pyrophosphate in finely divided form on the surfaces of said polyethylene terephthalate.

7. The process of claim 6 in which said liquid medium is water.

8. The process of claim 6 in which said liquid medium is mineral oil.

References Cited

UNITED STATES PATENTS

| | | | |
|---|---|---|---|
| 2,604,459 | 7/1952 | Jankowiak | 260—45.7 |
| 2,938,015 | 5/1960 | Gormley | 260—75 |
| 2,967,852 | 1/1961 | Frese | 260—45.9 |
| 3,039,999 | 6/1962 | Linville et al. | 260—75 |
| 3,201,369 | 8/1965 | Dell et al. | 260—45.75 |
| 3,228,898 | 1/1966 | Illing et al. | 260—18 |
| 3,256,237 | 6/1966 | Casey | 260—45.8 |
| 3,329,651 | 7/1967 | Dobinson | 260—45.8 |

DONALD E. CZAJA, Primary Examiner

R. A. WHITE, Assistant Examiner